United States Patent [19]
Karp

[11] Patent Number: 4,612,078
[45] Date of Patent: Sep. 16, 1986

[54] AUTOMATED ONE-STROKE LABEL APPLICATOR

[75] Inventor: Edward C. Karp, Belvidere, Ill.

[73] Assignee: Sanitary Scale Company, Belvidere, Ill.

[21] Appl. No.: 649,618

[22] Filed: Sep. 12, 1984

[51] Int. Cl.[4] .......... B44C 1/00; B32B 13/00; B65H 31/00; B23K 27/00

[52] U.S. Cl. .......... 156/493; 156/497; 156/542; 156/580; 156/361; 156/351; 156/DIG. 37

[58] Field of Search .......... 156/497, 540, 541, 542, 156/361, 488, 493, DIG. 31, 361, 351, 580, DIG. 37

[56] References Cited

U.S. PATENT DOCUMENTS

| | | | |
|---|---|---|---|
| 2,289,237 | 7/1942 | Brown | 156/493 |
| 4,025,382 | 5/1977 | DelRosso | 150/DIG. 31 |
| 4,026,755 | 5/1977 | Gossie | 150/DIG. 31 |
| 4,132,583 | 1/1979 | Hodgson | 156/361 |
| 4,367,118 | 1/1983 | Karp | 156/497 |

FOREIGN PATENT DOCUMENTS

| | | | |
|---|---|---|---|
| 1080923 | 4/1960 | Fed. Rep. of Germany | 156/493 |

*Primary Examiner*—Edward Kimlin
*Assistant Examiner*—Louis Falasco
*Attorney, Agent, or Firm*—Cook, Wetzel & Egan

[57] ABSTRACT

A label applicator is provided for applying pre-printed adhesive-backed labels from a printer to a corresponding commodity in a single stroke. A vacuum-assisted pick-up head receives the preprinted label and in one stroke delivers it and adheres it to a commodity. A new applicator head includes an integrated sponge-like, conformable portion which evenly applies the label, even across the face of an irregularly contoured commodity. The applicator head further includes a slidable pick-up and applicator tube, initially for retaining and then for spot sticking of the label to the commodity. A vacuum is applied to the applicator tube through a pick-up head having a hollow internal portion communicating, regardless of slide position, with the hollow applicator tube and, also, with the applicator head shaft, also having a hollow section for receiving the vacuum source. A downward stroke of the label applicator first causes the applicator tube to spot the label upon the commodity positioned below. As the downward stroke continues, the applicator tube is forced upward into the applicator head allowing the conformable sponge-like portion surrounding the applicator tube to conform and uniformly press the label to the package, regardless of package contour.

9 Claims, 2 Drawing Figures

AUTOMATED ONE-STROKE LABEL APPLICATOR

BACKGROUND OF THE INVENTION

The present invention relates generally to the commodity packaging and handling art. More particularly, the present invention is directed to an improved label applicator for applying printed labels from a label printer to a weighed commodity.

Integrated weighing and labelling stations for high-speed processing of commodities in supermarkets and commodity processing plants have long been known in the art. An example of such a device with the additional features of full-screen display of the label to be printed and inventory control is shown generally in U.S. Pat. No. 4,398,253, by Karp, et al., issued Aug. 9, 1983 and assigned to Sanitary Scale Company. In such a system, the label is printed, picked up by one vacuum assisted arm and transferred to a second transferring arm which then applies the label to the commodity as it is positioned below the applicating arm on indexing transfer. An example of a label applicator for adhering the printed label to the commodity is shown generally in U.S. Pat. No. 4,367,118, issued Jan. 4, 1983 by Karp and assigned to Sanitary Scale Company.

Although label applicators as shown generally in U.S. Pat. No. 4,367,118 have achieved industry-wide success and recognition, they typically require a large number of moving, coordinated parts which may drive up the cost of an already complex system. Further, due to the rather large number of movements necessary to transfer the label from the pick-up station to the commodity itself, the speed, and thereby the number of commodities which can be processed, may be limited by the designs of the prior art. Also, with the advent of acceptable quality thermal printers, which may be packaged in a more compact design, the need to vertically displace the printer from the conveyor is no longer acute. Therefore, it is desirable to provide an improved label applicator having simplified, though automated, mechanical movements to facilitate label application to commodities in a high speed environment.

Accordingly, it is a principal object of the present invention to provide an automated label applicator which generally overcomes the deficiencies of the prior art.

It is a further object of the present invention to provide an improved automated label applicator for applying a printed label from a pick-up station to a passing or intermittently moving commodity in a simple mechanical movement.

It is still a further object of the present invention to provide an improved automated label applicator which provides a uniform label application to irregularly shaped commodities in a single mechanical movement.

SUMMARY OF THE INVENTION

An automated label applicator for applying printed adhesive backed labels from a label pick-up station to a commodity is provided. The label applicator has a vacuum-assisted pick-up head and applicator head adapted to be positioned closely above the non-adhesive side of the label at the pick-up station to seize at least a portion of the label by its non-adhesive side as it is advanced at the pick-up station. The pick-up and applicator head is further adapted to move downwardly and apply the label to the commodity. The pick-up head may include a deformable applicator for applying an even, uniform application pressure to irregular commodities. Further, a centrally mounted, vertically slideable, weighted applicator tube may be positioned within the pick-up and applicator head and extend through the deformable applicator to apply an impact force to initially spot adhere the adhesive side of the label to the commodity, whether the commodity is flat or irregularly contoured.

During operation, the non-adhesive side of the printed label is seized by the pick-up and applicator head through a vacuum assist supplied through the mechanical mountings. When a slideable applicator tube is used, the vacuum may be applied through that tube which communicates with an internal channel within the pick-up head itself. A cam drive for the label applicator is provided in the adjacent system machinery and drives the applicator to apply the label when the commodity is positioned beneath the label applicator as the commodity is advanced along intermittently by an indexing and conveying mechanism.

BRIEF DESCRIPTION OF THE FIGURES

The features of the present invention which are believed to be novel are set forth with particularity in the appended claims. The invention, together with its objects and the operation thereof, may best be understood when taken in conjuction with the following detailed description and the drawings of which:

DETAILED DESCRIPTION OF THE INVENTION

Generally, the present invention relates to the automated food processing arts. More particularly, the present invention relates to label application in an automated weighing and labelling system and provides a new and useful apparatus for more efficient label application in such a system.

Figure 1:
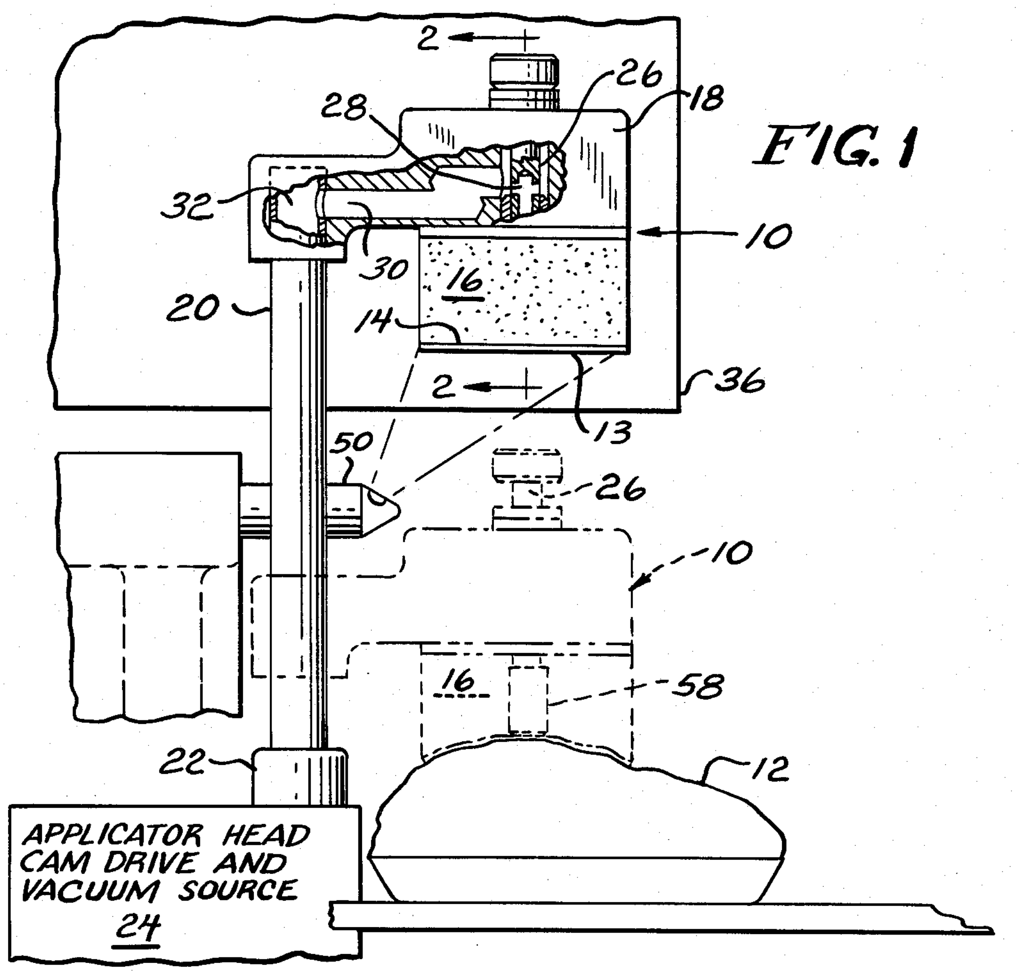
FIG. 1 is a front view of the applicator showing a cut-away section showing the internal structure of the pick-up and applicator head and a second position of the pick-up and applicator head at the downward limit of the application stroke when the applicator head is in contact with the commodity on the conveyor belt or transfer station.

Referring now to FIG. 1, therein is shown an automated one-stroke label applicator 10, generally comprising a head 18, a conformable applicator 16 and a tube 26, for applying a pre-printed label 13 to a commodity 12. In operation, label applicator 10 receives a pre-printed label 13 at a pick-up station at a bottom face 14 of conformable applicator 16. Applicator 16 is carried by a vacuum-assisted pick-up head 18 which is fixedly mounted on a shaft 20. The label is applied to the commodity 12 at the appropriate time as shaft 20 is pulled downward through a bushing 22 by the cam drive action of an applicator head cam drive and vacuum source 24. When shaft 20 is at the downward limit of its stroke, the label applicator 10 is in full contact with commodity 12 (as shown in the ghosted lines).

Hereinafter, the combination of pick-up head 18 and conformable applicator 16 will be referred to generally as label applicator 10 for functions which they perform as a single unit. Also, to the extent that pick-up head 18 and conformable applicator 16 have separable functions they will typically be identified as pick-up head 18 and applicator head 16 to indicate that the present invention is not limited to the exact embodiment depicted in the attached drawings and one or the other of pick-up head 18 and applicator head 16 may be redesigned to perform their combined functions.

The label 13 is carried on the applicator head 16 by means of a vacuum assist through the vacuum assist pick-up head 18 in connection with the hollow shaft 20. This vacuum assist is facilitated through the use of a hollow applicator tube 26. A hollow passageway 28 within tube 26 communicates with a hollow passageway 30 in pick-up head 18 which in turn communicates with a hollow passageway 32 in shaft 20. Passageway 32 in shaft 20 then, in turn, communicates with the vacuum source 24. Accordingly, a partial vacuum is provided at the tip of tube 26, which is approximately coincident with the face 14 of applicator head 16, to provide a partial vacuum at that point to cause the pre-printed label 13 to adhere at least partially to the face 14 of applicator head 16. This partial vacuum is maintained under the control of vacuum source 24 and is released before the applicator 10 begins its upward stroke after the label is applied to the commodity.

In an alternative embodiment, the vacuum provided at face 14 of applicator 16 may be broken through a valving action controlled by tube 26. That is, the connection between hollow passageway 28 in tube 26 and hollow passageway 30 in pick-up head 18 may be made dependent upon a horizontal alignment requiring tube 26 to be in approximately its downward position. When tube 26 is forced upward by impact with commodity 12, the vacuum may be broken and the label 13 released.

Figure 2:
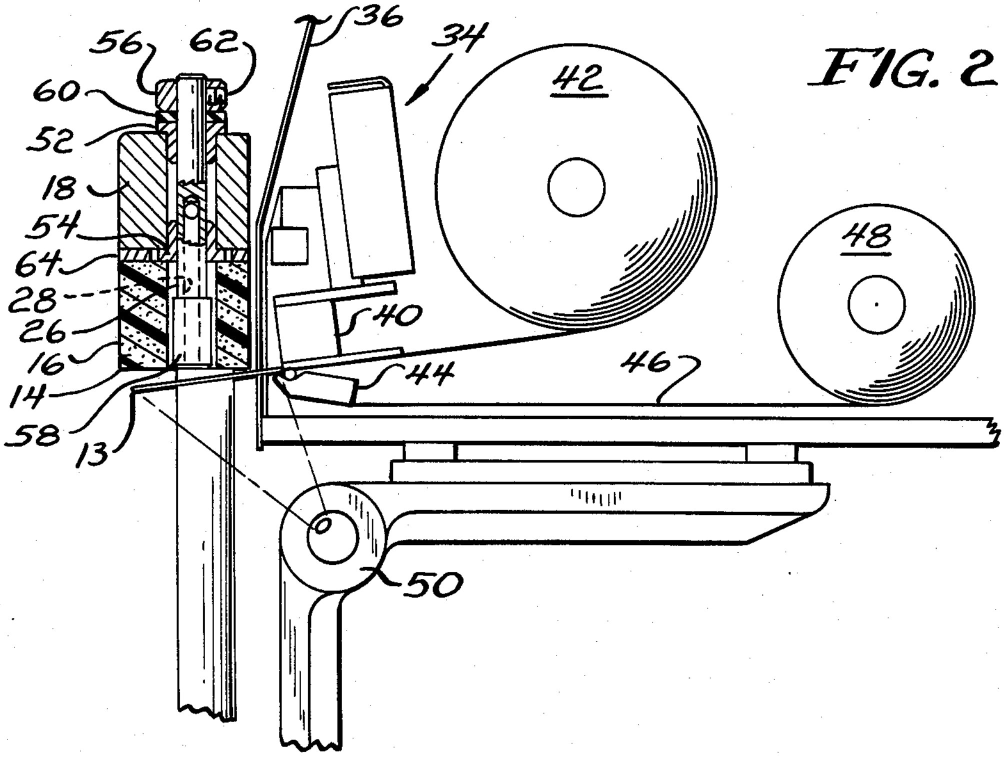
FIG. 2 is a cross-sectional, partial cut-away view of the pick-up and applicator head illustrating the internal structure and the weighted applicator tube in position to seize the non-adhesive side of a printed label.

The one-stroke label applicator 10 may be further appreciated by reference to FIG. 2. Therein is shown the label applicator 10 in close proximity with a printing unit 34 carried in a housing 36. Typically, a label 13 is provided to a printing station 40 from a roll of labels 42. Label 38 is printed, thermally or otherwise, at label printing station 40 and then the label roll is passed over a breaker bar 44 which causes the label 13 to separate from a non-adhesive backing 46 which is then taken up on a take-up roll 48.

As the label 13 is separated from adhesive backing 46, it is projected outward and tends to droop away from the bottom face 14 of applicator head 16. Correspondingly, the label 13 tends to droop away from the partial vacuum created at the outlet of passageway 28 in applicator tube 26. This drawback may be overcome by means of an air assist tube 50 which is oriented to provide a stream of air upward and at an angle toward the label 13 to cause it to contact the bottom face 14 of applicator head 16. At that point, the partial vacuum at the outlet of passageway 28 in applicator tube 26 will cause the label 13 to adhere at least partially to the face 14 of applicator head 16.

Once the label 13 is at least partially adhered to the applicator head 16, the entire label applicator 10 may be moved downward to contact the commodity 12 as shown in FIG. 1. On a practical basis, the label applicator 10 may be moved upward a short distance at the beginning of its downward stroke to cause the label 13 to fully separate from the non-adhesive backing 46. Once the label 13 is entirely separated from the backing 46 and is carried by the applicator head 16, the label applicator 10 may be driven downward to contact the commodity 12. This downward movement is provided by the applicator head cam drive and vacuum source 24 which operates in a known fashion.

The details of the label applicator 10 may be seen more clearly in the cut-away, cross-section view of FIG. 2. Specifically, applicator tube 26 may be seen to extend entirely through pick-up head 18 and applicator head 16. In the embodiment illustrated in FIG. 2, applicator tube 26 is free to travel through bushings 52 and 54 with the limits of its travel defined by the retaining collar 56 adhered to the topmost portion of applicator tube 26 and the fitting 58 which is carried at the bottom of applicator tube 26. The hollow channel 28 within applicator tube 26 is also illustrated. In the embodiment illustrated in FIG. 2, a rubber washer 60 is provided to protect bushing 52 from undue impact by retaining collar 56. Retaining collar 56 may be adhered to applicator tube 26 in any acceptable fashion. In the illustrated embodiment, retaining collar 56 is secured by means of a set screw 62.

Applicator tube 26 assists in the application of label 13 to the commodity 12 by providing an impact force at a localized or concentrated point to "stick" the label when the applicator head 16 first contacts the commodity 12. The solid, firm construction of the applicator tube 26 is in contrast to the soft, sponge-like consistency of the remainder of applicator head 16. Thus, the impact of applicator tube 26 causes the label to stick to the commodity, and the remaining sponge-like portion of applicator head 16 deforms around any irregularities in the commodity 12 to fully adhere the label to the commodity 12. This is shown with some particularity in the drawing of FIG. 1. It should also be noted that conformable applicator head 16 is envisioned to be constructed of sufficiently open cell, sponge-like material that it does not excessively deform laterally upon compression and bind the otherwise free movement of applicator tube 26.

Typically, the impact force provided by applicator tube 26 is proportional to its weight which is determined by the size of the fitting 58, the length of applicator tube 26, and the size of the retaining collar 56. If a greater impact force is desired, a larger or denser retaining collar 56 may be provided, for example. Alternatively, applicator tube 26 may be biased in a downward position by means of a spring or other suitable biasing apparatus.

As shown in FIG. 2, the sponge-like portion of applicator head 16 may be carried on a base plate 64. In this fashion, the sponge-like portion may be easily replaced if it becomes torn or worn out through use. Also, a safety guard plate may be adhered to the back of the pick-up head 18 to prevent hands or fingers or any other objects from interposing between the base of housing 36 and the top of pick-up head 18 when the label applicator 10 is in its downward stroke.

The air assist tube 50 which supplies the generally upward stream of air to cause the label 38 to remain in close proximity to face 14 of applicator head 16 will typically be positioned as shown in FIG. 1. The angular, upward stream of air from tube 50 so positioned will generally be sufficient to keep label 13 from drooping and to cause the label 13 to remain in a primarily flat configuration so as to facilitate the "seizing" action of the partial vacuum which is present at the applicator head 16. Also, placement of tube 50 as shown in FIG. 1 will allow all commodities to pass freely without obstruction by the air assist tube 50.

As mentioned before, the applicator head 16 may be made of any suitable deformable, elastomeric material, for example, polyethylane or polyurethane foam. Applicator tube 26 and the corresponding retaining head 56 and fitting 58 may be fabricated from any suitable material. Typically, they may be made of milled stainless steel. Alternatively, they may be fabricated of a hardened plastic. Similarly, the bushings which carry applicator tube 26 in pick-up head 18 may be fabricated of any suitable material such as nylon or other sufficiently low friction material. Likewise, pick-up head 18 may be fabricated of milled steel or a hardened plastic. It may be adhered to shaft 20 by means of a set-screw or other suitable fastening device. Shaft 20 will typically be fabricated from stainless steel, but it may be made of any other suitably hardened, durable material.

Although the present invention has been described above in terms of preferred embodiments, it is envisioned that the invention itself has been defined with particularity in the appended claims. Accordingly, such modifications as would be apparent to one skilled in the art and familiar with the teachings of this application are deemed to be within the spirit and scope of the present invention.

What is claimed is:

1. A label applicator for applying printed adhesive backed labels from a label pick-up station to a commodity wherein the printed label is presented in cantilever extension from the pick-up station, said label applicator comprising a vacuum assisted pick-up and applicator head adapted to be positioned closely above the non-adhesive side of a label adjacent the pick-up station to seize at least a portion of an extended label by its non-adhesive side, and means to move said pick-up and applicator head downwardly to apply the label to the commodity and to release the label from said pick-up and applicator head, said pick-up and applicator head being a composite structure including a slideably, vertically mounted rigid member to apply an initial impact force for engaging said label against the commodity and a conformable, elastomeric applicator for applying an even, uniform final applicating pressure to said label against the commodity.

2. The label applicator of claim 1 wherein said rigid member comprises a hollow applicator tube for supplying a partial vacuum suction to the label while in proximity to the pick-up station.

3. The label applicator of claim 2 wherein said applicator tube moves vertically upon engagement with the commodity to permit compression of said conformable, elastomeric applicator to conform to the contours of said commodity.

4. The label applicator of claim 1 futher including means positioned at the pick-up station for air driving the label upwardly toward the pick-up and applicator head to assist in establishing contact between a downward face surface of the pick-up and applicator head and the non-adhesive side of the label to be seized and applied.

5. A label applicator for applying printed adhesive backed labels from a label pick-up station to a commodity, said label applicator comprising:

a vacuum assisted pick-up head adapted to be positioned closely above the non-adhesive side of a label at the pick-up station to provide at least a partial vacuum;

a deformable elastomeric applicator head connected to said pick-up in communication with said partial vacuum and adapted to seize at least a portion of the label, said pick-up head and applicator head being adapted to move downwardly in combination and apply the label to the commodity; and slideably, vertically mounted applicator tube extending at least through said applicator head for applying an impact force to apply said label to said commodity.

6. The label applicator of claim 5 wherein said applicator tube includes a hollow portion for communicating said partial vacuum through said applicator head to seize said label.

7. The label applicator of claim 5 wherein said applicator head is removable for replacement.

8. The label applicator of claim 5 further including means positioned at the pick-up station for air-driving the label upwardly toward the appliator head to assist in the seizing of the non-adhesive side of said label by the partial vacuum at the applicator head.

9. A label applicator for applying printed, adhesive-backed labels from a pick-up station to a commodity, said label applicator comprising:

a deformable elastomeric applicator head adapted to be positioned closely above the non-adhesive side of a label at the pick-up station and adapted for applying an evenly distributed pressure to the label;

a slideably, vertically mounted applicator tube extending at least through said deformable applicator head for applying an impact force to adhere said label to said commodity;

air driving means positioned near the pick-up station for air-driving the label upwardly toward the applicator head as the label advances at the pick-up station;

vacuum assist means for providing at least a partial vacuum through said applicator tube to seize at least a portion of the label by its non-adhesive side; and drive means for driving said applicator head and applicator tube against the commodity to adhere the adhesive side of the label to the commodity.

* * * * *